United States Patent [19]

Onaka et al.

[11] Patent Number: 5,596,448
[45] Date of Patent: Jan. 21, 1997

[54] DISPERSION COMPENSATOR AND OPTICAL AMPLIFIER

[75] Inventors: Hiroshi Onaka; Motoyoshi Sekiya, both of Kawasaki, Japan

[73] Assignee: Fujitsu Limited, Kanagawa, Japan

[21] Appl. No.: 492,899

[22] Filed: Jun. 20, 1995

[30] Foreign Application Priority Data

Sep. 27, 1994 [JP] Japan .................................. 6-231481

[51] Int. Cl.⁶ .............................. H01S 3/00; G02B 6/26
[52] U.S. Cl. ......................... 359/341; 359/337; 359/161; 385/15
[58] Field of Search ................... 359/341, 337, 359/338, 161; 385/15

[56] References Cited

U.S. PATENT DOCUMENTS 5,404,413  4/1995  Delavaux et al. ...................... 385/15

OTHER PUBLICATIONS

COBRA: Compensating Optical Balanced Reflective Amplifier J. M. P. Delavaux, Senior member; pp. 5–9; Sep. 28, 1994.

*Primary Examiner*—Mark Hellner

[57] ABSTRACT

A dispersion compensator of the present invention includes a dispersion compensation fiber and a polarization conversion mirror. The dispersion compensation fiber has color dispersion of a sign opposite to the sign of the color dispersion of the optical fiber transmission line, and the length thereof is set so as to conform to the value of the color dispersion of the optical fiber transmission line. Light propagating in the optical fiber transmission line then propagates in the dispersion compensation fiber from a first end toward a second end of it and is supplied to the polarization conversion mirror. The light supplied to the polarization conversion mirror is converted into light of a polarization condition orthogonal and time-reversed to the polarization condition of the light supplied to the polarization conversion mirror, and propagates in the dispersion compensation fiber from the second end toward the first end of it. This enables compensation not only for color dispersion but also for polarization mode dispersion.

13 Claims, 7 Drawing Sheets

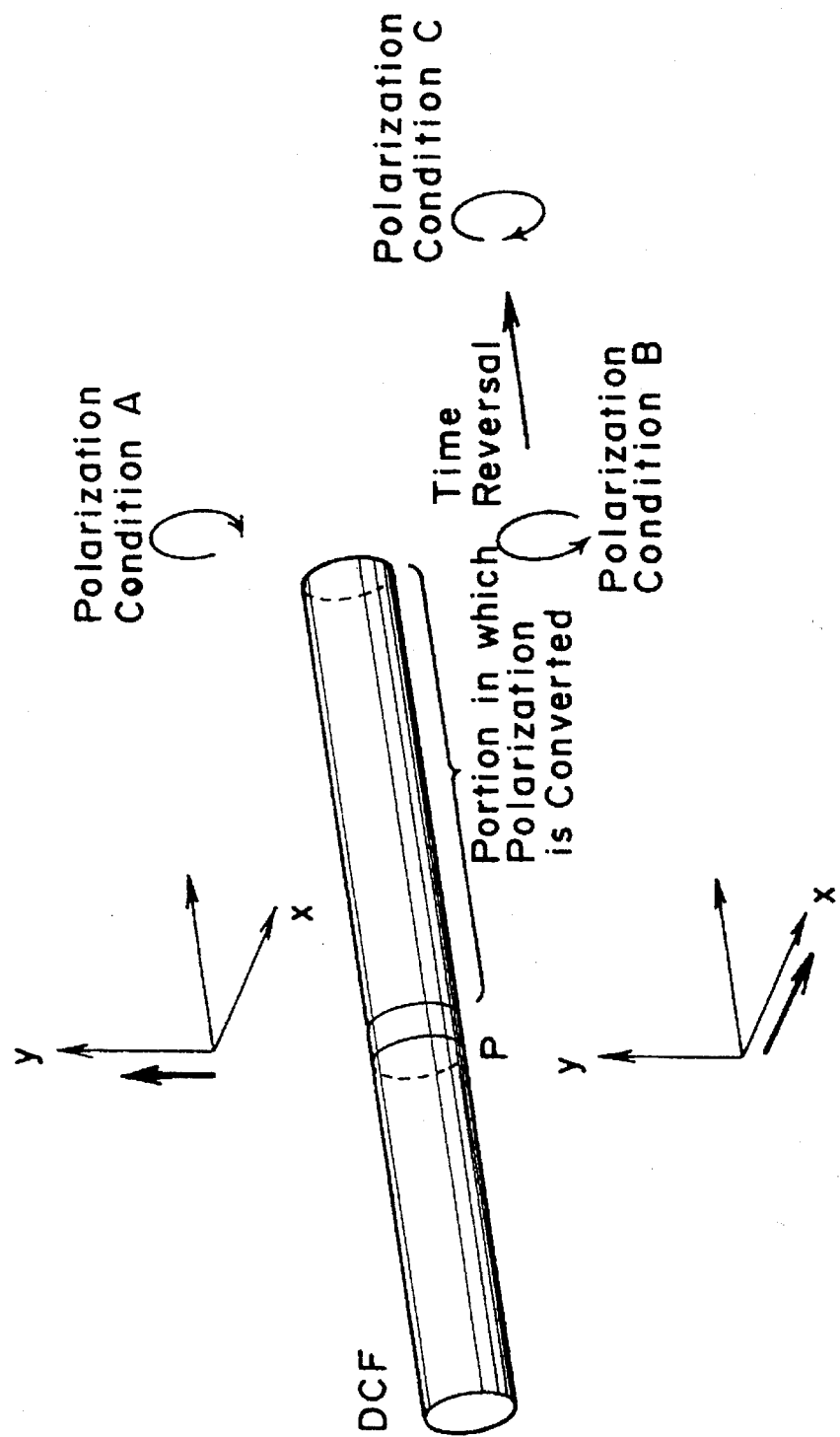

DISPERSION COMPENSATOR AND OPTICAL AMPLIFIER

BACKGROUND OF THE INVENTION

1. Field of the Invention

This invention relates to a dispersion compensator and an optical amplifier, and more particularly to a dispersion compensator and an optical amplifier which are free from an influence of polarization mode dispersion.

2. Description of the Related Art

In recent years, owing to an appearance of an erbium-doped optical fiber amplifier (EDFA), investigations have been and are being made for a transmission system which amplifies light directly. In such circumstances, a demand for increase in capacity, increase in transmission distance and improvement in function wherein an EDFA is employed is increasing also in a single mode fiber network which exhibits a zero dispersion in the 1.3 μm band of an existing system. Since an EDFA is an optical amplifier which operates in the 1.5 μm band, where it is applied to a single mode fiber network which exhibits a zero dispersion in the 1.3 μm band of an existing system, it transmits an optical signal of the 1.5 μm band therethrough, and in this instance, an influence of color dispersion(wavelength dispersion) cannot be ignored. Accordingly, in order to make such application possible, a dispersion compensator for suppressing color dispersion is required.

One of popular methods of suppressing a color dispersion is to connect a dispersion compensator which has dispersion of a sign opposite to that of dispersion produced in a transmission line to an intermediate portion or an end of the transmission line so as to offset the color dispersion of the transmission line. Various dispersion compensation have been proposed including (1) a dispersion compensator which employs a grating, (2) another dispersion compensation which employs an optical interference unit and (3) a further dispersion compensator which employs an optical fiber (dispersion compensation fiber). Among various dispersion compensators proposed by now, a dispersion compensator which employs a dispersion compensation fiber is expected to be highest in practicability due to the facts that it does not require a control circuit and so forth for stabilizing the operation of the dispersion compensator and allows a passive operation and that it has an applicable wavelength bandwidth much wider than the other compensators.

Since a single mode fiber employed for a transmission line has color dispersion of the positive sign of approximately +15 to +20 ps/nm/km in the 1.5 μm band, a dispersion compensation fiber is required to have color dispersion of the negative sign. Further, in order to manufacture a dispersion compensator in a small size, the color dispersion of the dispertion compensation fiber is required to have a high absolute value. In order to satisfy those requirements, various solutions have been proposed including adoption of a structure which has a very high numerical aperture (M. Onishi, Y. Koyama, M.Shigematsu, H. Kanamori and M. Nishimura, "Dispersion compensating fibre with a high figure of merit of 250 ps/nm/dB", Electron. Lett., 1994, vol. 30, no. 2, pp.161–163), adoption of a multiple clad structure (Ashish M. Vengsarkar and W. A. Read, "Dispersion-compensating single-mode fibers: efficient designs for first- and second-order compensation", Opt. Lett., 1993, vol. 18, no. 11, pp.924–926) and adoption of an elliptic core structure (C. D. Poole, J. M. Wiesenfeld and D. J. DiGiovanni, "Elliptical-Core Dual-Mode Fiber Dispersion Compensator", IEEE Photon. Technol. Lett., 1993, vol. 5, no. 2, pp.194–197), and dispersion values exceeding –100 ps/nm/km have been reported.

Whichever technique is employed, in order to realize a dispersion compensation fiber of a high performance, the core diameter is reduced to a very low value comparing with an ordinary single mode fiber or the structure is complicated. A fiber of the type just mentioned is liable to exhibit some non-uniformity in structure, and there is the possibility that the polarization mode dispersion may have a considerably high value such as, for example, 1 ps/√km or more comparing with the polarization mode dispersion (for example, 0.1 to 0.2 ps/√km) of an ordinary single mode fiber. As an example, if a transmission system of 200 km which employs as a transmission line a single mode fiber whose dispersion value with respect to an optical signal of the 1.5 μm band is 18 ps/nm/km is considered, then the dispersion which is produced in the transmission line is 3,600 ps/nm. In order to cancel this dispersion using a dispersion compensation fiber having a dispersion value of –100 ps/nm/km, a dispersion compensation fiber of the length of 36 km is required. Where the dispersion compensation fiber has polarization mode dispersion of 2.5 ps/√km, relying upon the polarization condition of light incident to the dispersion compensation fiber, a delay time difference of approximately 2.5× $\sqrt{36}$=15 ps is produced over the distance of 36 km. This value is approximately 15% of 100 ps which is one time slot in transmission at the rate of 10 Gb/s and makes a factor which deteriorates the reception sensitivity very much. Meanwhile, also a doped fiber of an EDFA is liable to produce polarization mode dispersion due to its non-uniformity in structure, and it is required to prevent such polarization mode dispersion.

SUMMARY OF THE INVENTION

Accordingly, it is an object of the present invention to provide a dispersion compensator which can compensate for a color dispersion without having an influence of a polarization mode dispersion.

It is another object of the present invention to provide an optical amplifier which is not influenced by a polarization mode dispersion.

In accordance with an aspect of the present invention, there is provided a dispersion compensator for compensating for color dispersion of an optical fiber transmission line, comprising a dispersion compensation fiber having color dispersion of a sign opposite to a sign of color dispersion of the optical fiber transmission line and having a length set so as to conform to a value of the color dispersion of the optical fiber transmission line, optical coupling means having first to third ports, the first port being connected to an output end of the optical fiber transmission line, the second port being connected to a first end of the dispersion compensation fiber, the optical coupling means outputting light supplied to the first port from the second port, the optical coupling means outputting light supplied to the second port from the third port, and a polarization conversion mirror for converting light outputted from a second end of the dispersion compensation fiber into light having a polarization condition orthogonal and time-reversed to a polarization condition of the light outputted from the second end of the dispersion compensation fiber and supplying the light obtained by the conversion back to the second end of the dispersion compensation fiber.

In accordance with another aspect of the present invention, there is provided an optical amplifier for amplifying and outputting signal light from an optical fiber transmission line, comprising first optical coupling means having first to third ports, the first port being connected to an output end of the optical fiber transmission line, the first optical coupling means outputting light supplied to the first port from the second port, the first optical coupling means outputting light supplied to the second port from the third port, a pumping light source for outputting pumping light, second optical coupling means having fourth to sixth ports, the fourth port being connected to the pumping light source, the fifth port being connected to the second port, the second optical coupling means outputting light supplied to the fourth and fifth ports from the sixth port, a doped fiber connected at a first end thereof to the sixth port and doped at least at a core thereof with a rare earth element, and a polarization conversion mirror for converting light outputted from a second end of the doped fiber into light having a polarization condition orthogonal and time-reversed to a polarization condition of the light outputted from the second end of the doped fiber and supplying the light obtained by the conversion back to the second end of the doped fiber, the signal light from the optical fiber transmission line being amplified while it reciprocates in the doped fiber and then supplied to the second port passing the sixth port and the fifth port in this order.

In accordance with a further aspect of the present invention, there is provided an optical amplifier for amplifying and outputting signal light from an optical fiber transmission line, comprising first optical coupling means having first to third ports, the first port being connected to an output end of the optical fiber transmission line, the first optical coupling means outputting light supplied to the first port from the second port, the first optical coupling means outputting light supplied to the second port from the third port, a pumping light source for outputting pumping light, second optical coupling means having fourth to sixth ports, the fourth port being connected to the pumping light source, the fifth port being connected to the second port, the second optical coupling means outputting light supplied to the fourth and fifth ports from the sixth port, a dispersion compensation fiber connected at a first end thereof to the sixth port for causing non-linear scattering with the pumping light, and a polarization conversion mirror for converting light outputted from a second end of the dispersion compensation fiber into light of a polarized condition orthogonal and time-reversed to a polarization condition of the light outputted from the second end of the dispersion compensation fiber and supplying the light obtained by the conversion back to the second end, the signal light from the optical fiber transmission line being amplified by the non-linear scattering while it reciprocates in the doped fiber and then supplied to the second port passing the sixth port and the fifth port in this order.

In the dispersion compensator and the optical amplifiers of the present invention, since a polarization conversion mirror of a specific construction is employed, polarization mode dispersion is suppressed in accordance with the principle which will be hereinafter described, and the objects of the present invention are attained.

In a dispersion compensation fiber, an optical non-linear effect in the fiber appears notably due to the facts that the core diameter is small and that the core thereof is doped in a high concentration with an element such as Ge in order to assure a high specific refraction factor difference. Consequently, an optical amplification action which makes use of non-linear scattering (stimulated Raman scattering or stimulated Brillouin scattering) in the fiber is liable to occur. In order to cause such optical amplification action to occur, pumping light is supplied to the dispersion compensation fiber. Raman scattering has a wide gain width although the gain coefficient is low, and is suitably used for amplification of a very high speed signal or a signal for wavelength multiplex transmission (WDM). Where Raman scattering is utilized, the wavelength of the pumping light for amplifying a signal of the 1,550 nm band ranges from 1460 to 1480 µm, and a pumping light source for an EDFA can be used as it is.

In the case of an amplifier which makes use of non-linear scattering of an optical fiber, a gain is produced only in the polarization direction of the pumping light. Consequently, in order to amplify signal light, which arrives there in an arbitrary polarization direction, to a required level, such a technique as polarization multiplexing of pumping light or polarization scrambling is preferably employed.

In a form of the present invention which makes use of non-linear scattering in an optical fiber, since a polarization conversion mirror is employed, signal light which propagates back and forth in the dispersion compensation fiber exhibits orthogonal polarization conditions to each other on the going path and the returning path, and consequently, a substantially fixed amplification factor can be obtained irrespective of the polarization condition of the pumping light. For example, when the polarization conditions of the signal light and the pumping light coincide with each other on the going path, an amplification action occurs on the going path. However, on the returning path, since the polarization conditions of the pumping light and the signal light are orthogonal to each other, little amplification action occurs. It is to be noted that also a component of the pumping light which propagates together with the signal light and returns after conversion of the polarization thereof is present, and the component of the pumping light continuously provides a gain to the signal light. However, during propagation of the component of the pumping light, the amplification factor drops due to a loss by the fiber (for example, after the component of the pumping light propagates over approximately 10 km, it does not exhibit an amplification action). On the contrary, when the polarization conditions of the signal light and the pumping light are orthogonal to each other on the going path, no amplification action occurs on the going path. However, on the returning path, since the polarization conditions of the signal light and the pumping light coincide with each other due to polarization conversion, an amplification action occurs. In this manner, in accordance with the present invention, an amplification action which does not rely upon a polarization condition can be achieved without using a special technique for eliminating the polarization dependency of the amplification factor.

The above and other objects, features and advantages of the present invention and the manner of realizing them will become more apparent, and the invention itself will best be understood, from a study of the following description and appended claims with reference to the attached drawings showing some preferred embodiments of the invention.

BRIEF DESCRIPTION OF THE DRAWINGS

FIGS. 1A, 1B and 2 are schematic views illustrating the principle of the present invention;

DESCRIPTION OF THE PREFERRED EMBODIMENTS

In the following, embodiments of the present invention will be described in detail with reference to the accompanying drawings.

Figure 1A:
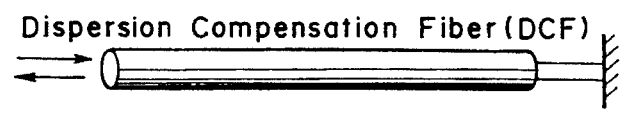
Figure 1B:
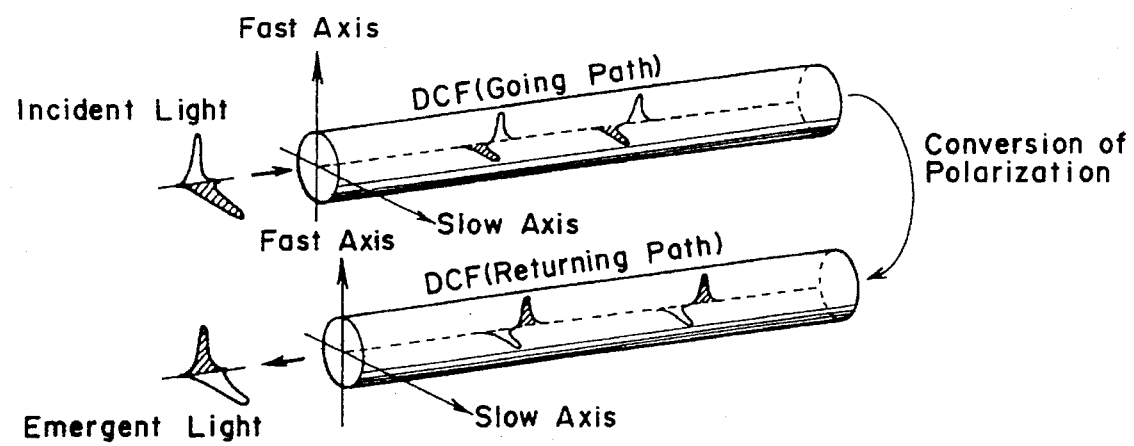

FIGS. 1A, 1B and 2 are schematic views illustrating the principle of the present invention. In order to cancel polarization mode dispersion produced in an optical fiber, birefringence produced in the optical fiber should be compensated for. To this end, a dispersion compensation fiber DCF should be folded back so that polarization mode dispersion produced in a going path may be canceled in a returning path as seen in FIG. 1A. In particular, when polarization mode dispersion is produced in two orthogonal polarization components of incident light in the going path, the polarization mode dispersion can be canceled in the returning path after the polarization condition of it is converted suitably as seen in FIG. 1B.

This will be described in more detail with reference to FIG. 2. First, attention is paid to polarization mode dispersion produced at a certain small section P in the dispersion compensation fiber DCF. In order to cancel the polarization mode dispersion produced at the section, light must be returned there in a polarization condition orthogonal to the polarization condition of the light in the going path at the section. In particular, if x-y orthogonal coordinate axes are determined suitably at the small section P and linearly polarized light whose polarization condition on the going path is on the y-axis is considered, then if the light is in a linearly polarized condition on the x-axis when it returns to the small portion P after it is reciprocated along the dispersion compensation fiber DCF, then the polarization mode dispersion is canceled.

By the way, linearly polarized light beams whose polarization conditions on the going path are individually on the x-axis and the y-axis (that is, which are in orthogonally polarized conditions to each other) undergo variations in polarization condition during propagation thereof in the dispersion compensation fiber DCF so that they are converted into beams of elliptically polarized light before they emerge from the emerging end of the dispersion compensation fiber DCF. Where the polarization conditions are individually represented by A and B, an orthogonal relationship stands between them. Accordingly, in order for the polarization condition of light returning along the dispersion compensation fiber DCF and arriving at the small section P to have an orthogonal relationship to an original polarization condition of it, light of the polarization condition A at an end face of the dispersion compensation fiber DCF should be converted into light of the polarization condition B which is in an orthogonal relationship to the polarization condition A and then time-reversed to obtain light of a further polarization condition C to be introduced into the dispersion compensation fiber DCF again. The reason why such time reversal is performed is that the direction in which light propagates is opposite between the going path and the returning path.

As a more detailed example, a case is supposed wherein linearly polarized light whose polarization condition on the going path is on the y-axis in the small section P is disturbed in polarization within the dispersion compensation fiber DCF so that it is converted into clockwise circularly polarized light at the end face of the fiber. In this instance, if counterclockwise circularly polarized light which is an orthogonally polarized condition to that of the clockwise circularly polarized light is supposed and clockwise circularly polarized light obtained by further time reversing operation of the counterclockwise circularly polarized light is introduced into the dispersion compensation fiber DCF, then the light arriving at the small section P has been converted into linearly polarized light on the x-axis, and consequently, the polarization mode dispersion has been canceled.

The argument described just above stands at any position of the dispersion compensation fiber in its longitudinal direction, and in whatever manner the intrinsic axes (proper axes) of polarization dispersion which causes polarization mode dispersion are distributed in the fiber, or at any position of the dispersion compensation fiber, the light beams on the going path and the returning path will have an orthogonally polarized relationship to each other by applying such a polarization conversion operation as described above to the light. In other words, a polarization mode dispersion can be canceled irrespective of the length of the dispersion compensation fiber or the polarization condition in the inside of the polarization compensation fiber.

Figure 3:
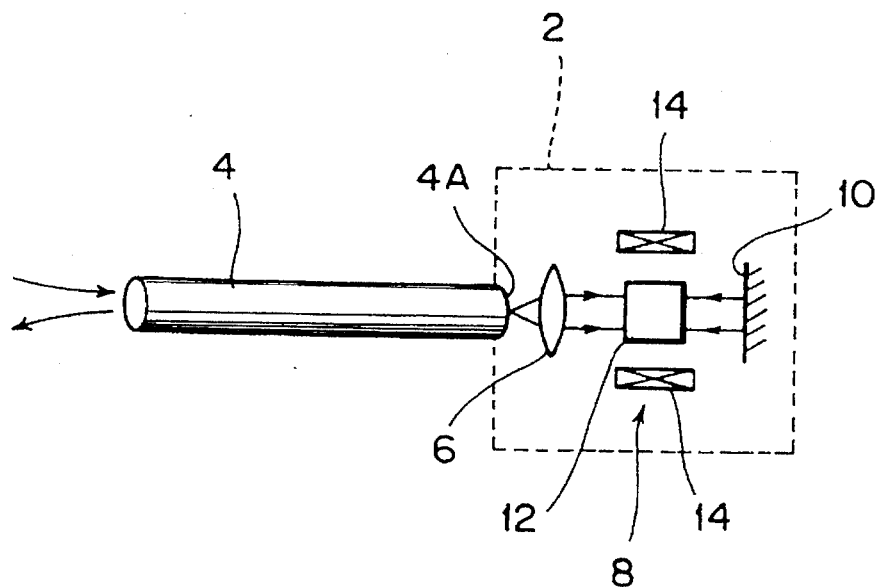
FIG. 3 is a diagrammatic view showing an example of the construction of a polarization conversion mirror.

One of elements which can realize such an orthogonally polarized time-reversed condition as described above is such a polarization conversion mirror as shown in FIG. 3. Referring to FIG. 3, the polarization conversion mirror 2 shown includes a lens 6 serving as collimate means for converting a divergent/convergent beam into a parallel beam on a main optical path or vice versa at an end 4A of a dispersion compensation fiber 4, and a 45-degree Faraday rotator 8 and a mirror 10 disposed in this order on the main optical path. The 45-degree Faraday rotator 8 includes a magneto-optical crystal element 12 such as a YIG element disposed on the main optical path, and a permanent magnet 14 for applying a magnetic field in the direction of the main optical path to the magneto-optical crystal element 12. The thickness of the magneto-optical crystal element 12 in the direction of the main optical path and the intensity of the magnetic field formed by the permanent magnet 14 are set so that the rotatory polarization angle may be 45 degrees.

For example, if light outputted from the end 4A of the dispersion compensation fiber 4 is in a clockwise circularly polarized condition, the light after it passes from the left to the right in FIG. 3 through the 45-degree Faraday rotator 8 and is reflected by the mirror 10 and then returns passing from the right to the left through the 45-degree Faraday rotator 8 is clockwise circularly polarized light similarly to the original light. In particular, if it is considered that the original clockwise circularly polarized light changes to counterclockwise circularly polarized light which is in an orthogonal condition to the original clockwise circularly polarized light and then the counterclockwise circularly polarized light is time-reversed back into original clockwise circularly polarized light, then it is understood that a desired operation has been performed. On the other hand, where light outputted from the dispersion compensation fiber 4 is linearly polarized light, the light after it passes through the 45-degree Faraday rotator 8, is reflected by the mirror 10 and then returns passing through the 45-degree Faraday rotator 8 again is linearly polarized light polarized orthogonally to the original linearly polarized light. Also in this instance, it is understood that a desired operation has been performed.

It is to be noted that, in order to cancel polarization mode dispersion using such a polarization conversion mirror as shown in FIG. 3, it is required that the polarization condition of an optical signal in the fiber does not vary within the time within which the optical signal reciprocates in the dispersion compensation fiber. Generally, the polarization condition in the inside of an optical fiber is momentarily varied by a disturbance such as a temperature variation of the environment in which the optical fiber is laid or an external pressure to the optical fiber. However, such a variation in polarization condition is a moderate variation which is caused by a temperature variation or the like, and when it is taken into consideration that the length of a dispersion compensation fiber used in the present invention is 50 km to the utmost, the influence of a disturbance can be ignored within a time (about 250 µs) within which an optical signal propagates over such distance.

Figure 4:
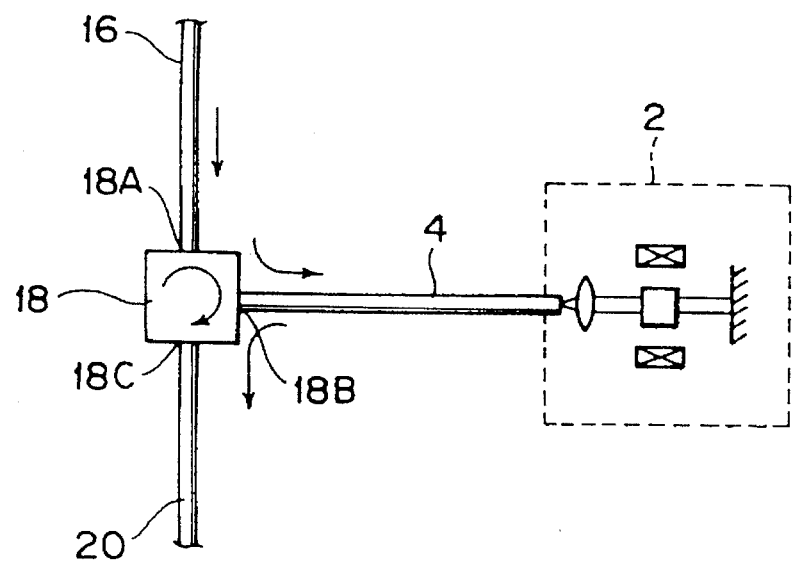
FIG. 4 is a diagrammatic view showing a first embodiment of the dispersion compensator.

FIG. 4 is a view showing a first embodiment of the dispersion compensator of the present invention. Reference numeral 16 denotes an optical fiber transmission line whose color dispersion should be compensated for, and 18 denotes an optical circulator of the three port type. The optical circulator 18 functions to output light supplied to a port 18A thereof from another port 18B thereof and output light supplied to the port 18B thereof from a further port 18C thereof. An output end of the optical fiber transmission line 16 is connected to the port 18A, and a first end of a dispersion compensation fiber 4 is connected to the port 18B. Further, the polarization conversion mirror 2 shown in FIG. 3 is connected to a second end of the dispersion compensation fiber 4. An outputting optical fiber 20 is connected to the port 18C of the optical circulator 18.

The sign of the color dispersion of the dispersion compensation fiber 4 is opposite to the sign of the color dispersion of the optical fiber transmission line 16. Preferably, the value of the color dispersion of the dispersion compensation fiber 4 is set to approximately one half the value of the color dispersion of the optical fiber transmission line 16. With the construction described above, since light propagating in the optical fiber transmission line 16 reciprocates in the dispersion compensation fiber 4 and is supplied to the optical fiber 20, color dispersion produced in the optical fiber transmission line 16 can be compensated for. Further, since a polarization conversion mirror is employed in order to cause an optical signal to reciprocate in the dispersion compensation fiber 4, polarization mode dispersion produced in the dispersion compensation fiber 4 can be canceled. Furthermore, since an optical signal reciprocates in the dispersion compensation fiber 4, the length of the dispersion compensation fiber can be reduced to approximately one half that of a conventional dispersion compensator.

Figure 5:
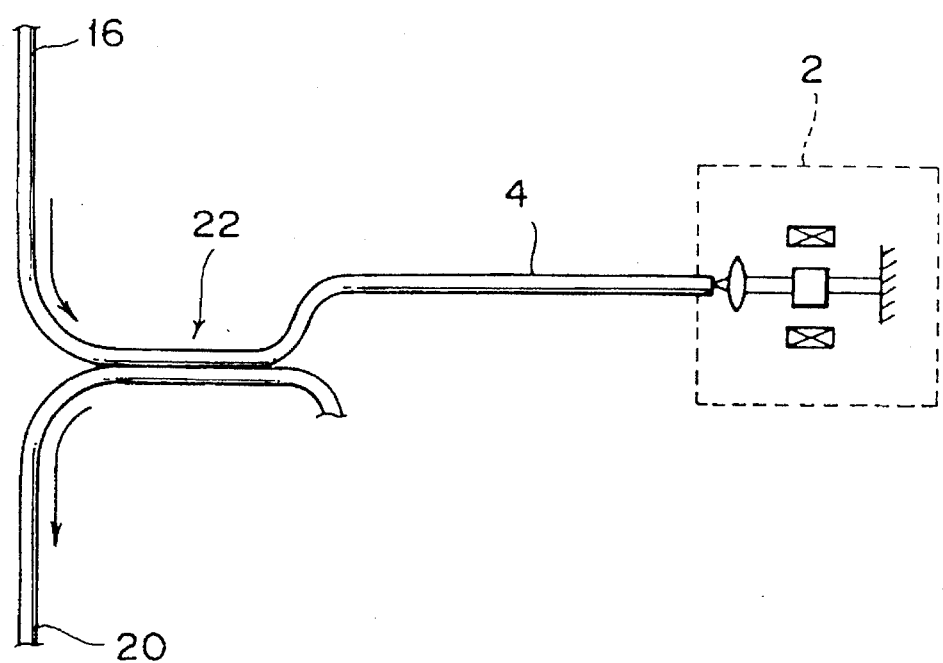
FIG. 5 is a diagrammatic view showing a second embodiment of the dispersion compensator.

FIG. 5 is a view showing a second embodiment of the dispersion compensator of the present invention. The present embodiment is characterized in that an optical directional coupler (optical coupler) 22 is employed in place of the optical circulator 18 employed as optical coupling means in the first embodiment of FIG. 4. In the present embodiment, some loss is produced before an optical signal supplied from the optical fiber transmission line 16 reaches the optical fiber 20 on the output side. However, there is an advantage in that an optical circulator which generally has a complicated construction is not required. Further, where an optical coupler of the fiber fusion type is employed for the optical directional coupler 22, the loss by connection can be suppressed to the minimum.

Figure 6:
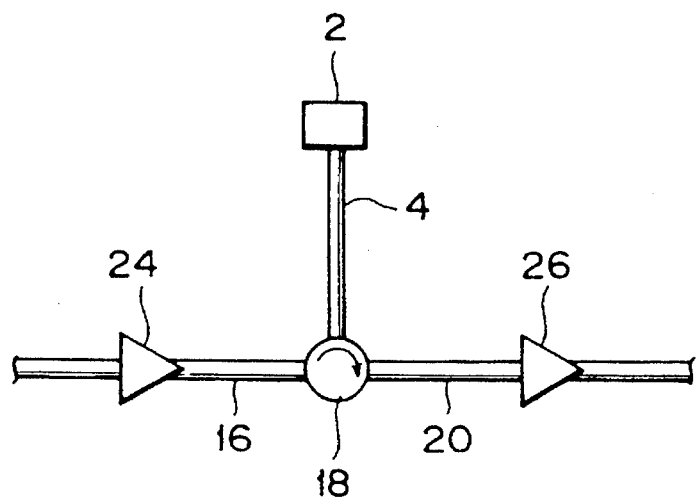
FIG. 6 is a diagrammatic view showing a third embodiment of the dispersion compensator.

FIG. 6 is a view showing a third embodiment of the dispersion compensator of the present invention. When it is tried to compensate for color dispersion of an optical fiber transmission line by means of a dispersion compensation fiber, in order to compensate for the loss by the dispersion compensation fiber, an optical amplifier is applied frequently. In this instance, it is advantageous for miniaturization of an apparatus and reduction in cost to employ an optical circulator as optical coupling means as in the first embodiment of FIG. 4. Details will be described below.

The third embodiment of FIG. 6 is characterized in contrast with the first embodiment of FIG. 4 in that an optical amplifier 24 is provided intermediately of the optical fiber transmission line 16 and another optical amplifier 26 is provided also intermediately of the output side optical fiber 20. Each of the optical amplifiers 24 and 26 includes, as an optical amplification medium, a doped fiber doped at least at a core thereof with a rare earth element such as, for example, Er. Where such an optical amplification medium as just mentioned is employed, in order to prevent formation of a resonant optical path including the optical amplification medium, optical isolators are usually provided on the upstream side and the downstream side of the optical amplification medium.

In the present embodiment, since the optical circulator 18 can serve also as an optical isolator described above, an optical amplifier of a simple construction can be employed, and miniaturization of the apparatus and reduction in cost can be achieved. The length of the dispersion compensation fiber is preferably optimized in accordance with a dispersion value of an optical fiber transmission line whose color dispersion should be compensated for. To this end, the dispersion compensation fiber can preferably be removed readily, and where no dispersion compensation fiber is required, preferably a dummy fiber which does not provide any dispersion, an attenuator for adjusting the optical level or the like can be connected. The form shown in FIG. 6 can satisfy such requirement readily.

Figure 7:
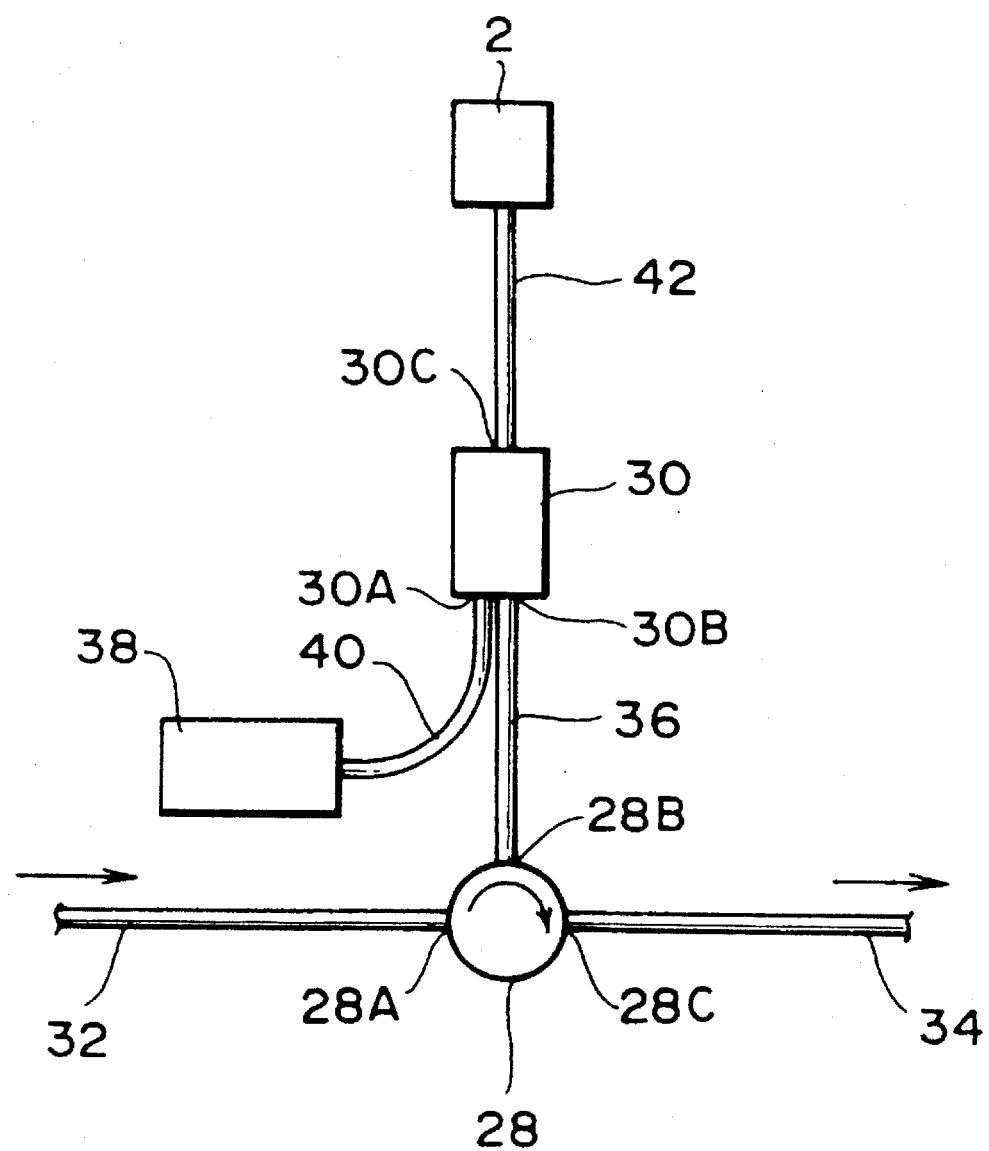
FIG. 7 is a diagrammatic view showing a first embodiment of the optical amplifier.

FIG. 7 is a view showing a first embodiment of the optical amplifier of the present invention. As optical coupling means, an optical circulator 28 and a wavelength division coupler 30 are employed. The optical circulator 28 has three ports 28A, 28B and 28C and functions to output light supplied to the port 28A from the port 28B and output light supplied to the port 28B from the port 28C. An optical fiber transmission line 32 on the input side is connected to the port 28A, and an optical fiber 34 on the output side is connected to the port 28C. Meanwhile, the port 28B is connected to a port 30B of the wavelength division coupler 30 by way of an optical fiber 36. Reference numeral 38 denotes a pumping light source for outputting pumping light of a predetermined wavelength. The pumping light source 38 includes, for example, a laser diode. The pumping light source 38 is connected to another port 30A of the wavelength division coupler 30 by way of an optical fiber 40. A first end of a doped fiber 42 is connected to a further port 30C of the wavelength division coupler 30, and a second end of the doped fiber 42 is connected to such a polarization conversion mirror 2 as shown in FIG. 3.

When the wavelength of signal light to be amplified which is supplied by way of the optical fiber transmission line 32 is in the 1.5 μm band, for example, Er is selected as a dopant of the doped fiber 42. In this instance, the wavelength of the pumping light is set to, for example, 0.98 μm. The wavelength division coupler 30 supplies pumping light supplied to the port 30A thereof and signal light supplied to the port 30B thereof both from the port 30C to the doped fiber 42 based on a difference in wavelength between the signal light and the pumping light. The signal light amplified while the pumping light and the signal light reciprocate in the doped fiber 42 passes through the ports 30C and 30B in this order and is supplies to the port 28B of the optical circulator 28, whereafter it is sent out further from the port 28C to the optical fiber 34.

In the present embodiment, since the polarization conversion mirror 2 having the functions described above is used so as to allow signal light and pumping light to reciprocate in the doped fiber 42, any polarization mode dispersion produced in the doped fiber 42 can be canceled, which allows application of the optical amplifier to a high speed system. Further, since the doped fiber 42 is used for both of the going and returning paths, the length of the doped fiber 42 can be reduced as much. Furthermore, it can be anticipated to reduce polarization hole burning which occurs in an optical amplifier.

Figure 8:
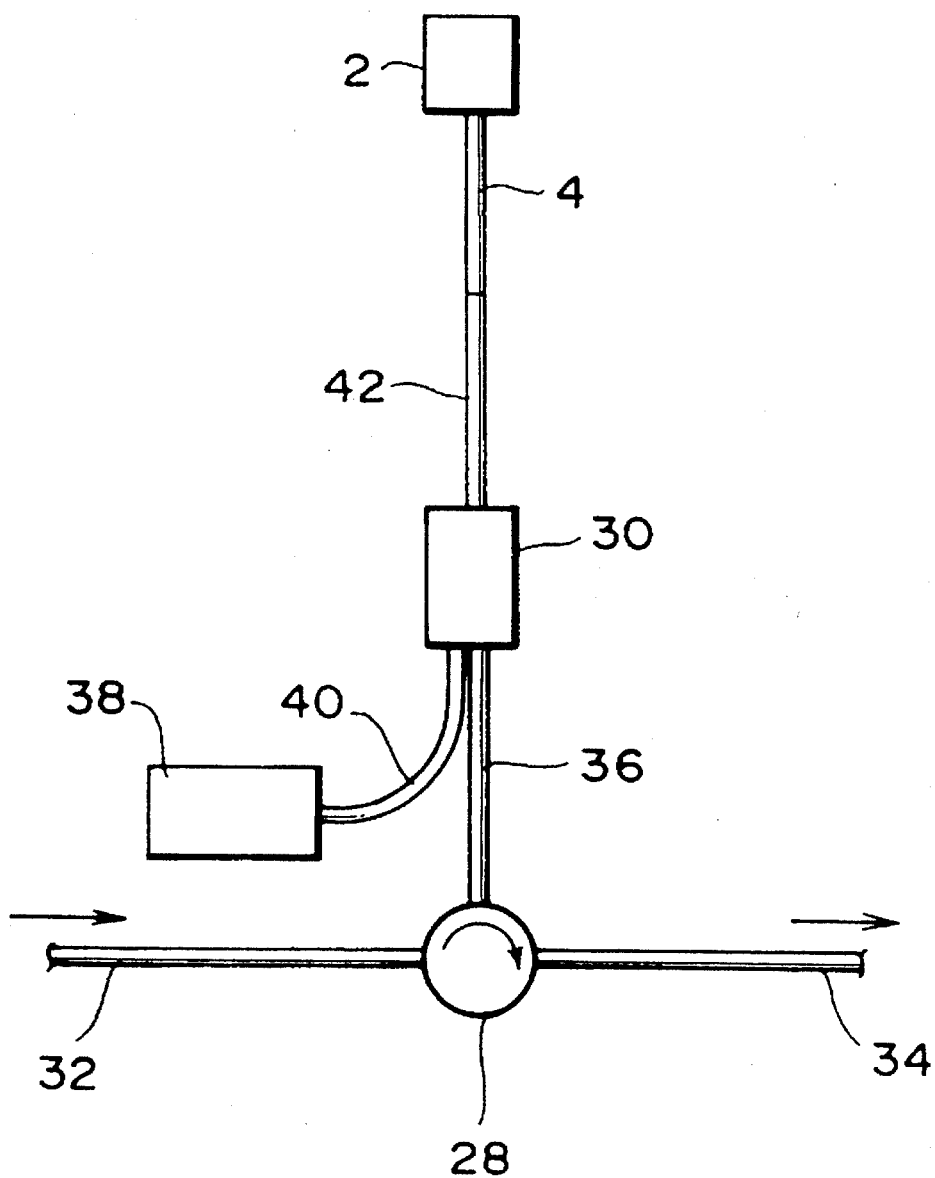
FIG. 8 is a diagrammatic view showing a second embodiment of the optical amplifier.

FIG. 8 is a view showing a second embodiment of the optical amplifier of the present invention. The present embodiment is characterized in contrast with the embodiment of FIG. 7 in that it further includes a dispersion compensation fiber 4 connected in cascade connection to the doped fiber 42. The dispersion compensation fiber 4 is equivalent to that employed in the embodiments of the dispersion compensator. The dispersion compensation fiber 4 has color dispersion of a sign opposite to the sign of the color dispersion of the optical fiber transmission line 32, and the length thereof is set so as to conform to the value of the color dispersion of the optical fiber transmission line 32. While, in the present embodiment, the dispersion compensation fiber 4 is provided between the doped fiber 42 and the polarization conversion mirror 2, the arrangement of the dispersion compensation fiber 4 and the doped fiber 42 may alternatively be reversed. According to the present embodiment, it is possible to provide an optical amplifier which has a function of compensating for the color dispersion of the optical fiber transmission line 32. Further, since the polarization conversion mirror 2 is employed, polarization mode dispersion of the doped fiber 42 and the dispersion compensation fiber 4 can be suppressed.

Figure 9:
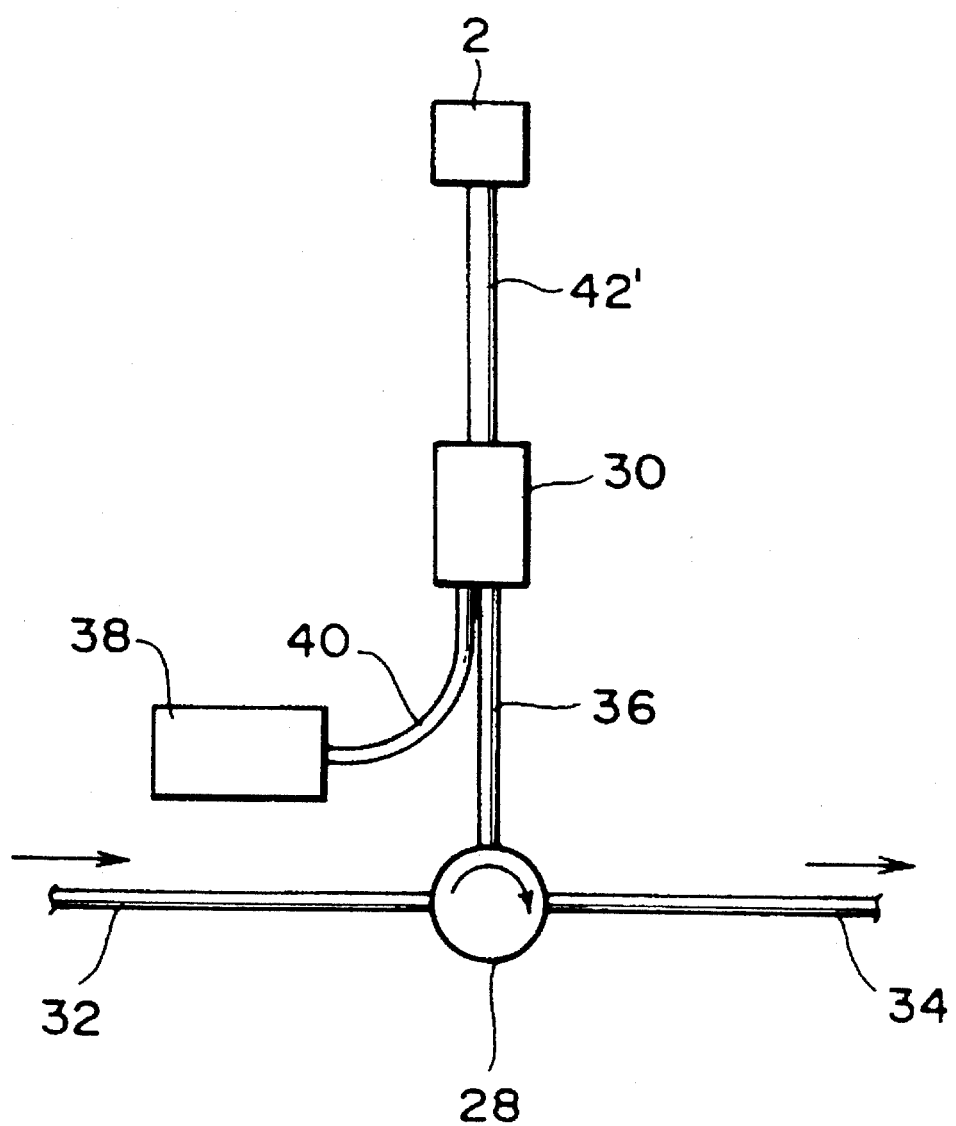
FIG. 9 is a diagrammatic view showing a third embodiment of the optical amplifier.

FIG. 9 is a view showing a third embodiment of the optical amplifier of the present invention. The present embodiment is characterized in contrast with the embodiment of FIG. 7 in that a doped fiber 42' having a dispersion compensation function is employed in place of the doped fiber 42. The doped fiber 42' is doped with a rare earth element such as Er for amplifying light. Further, in order to compensate for a color dispersion of the optical fiber transmission line 32, the doped fiber 42' has color dispersion of a sign opposite to the sign of the color dispersion of the optical fiber transmission line 32, and the length thereof is set so as to conform to the value of the color dispersion of the optical fiber transmission line 32. Since no particular technical difficulty in manufacture is involved in doping of a dispersion compensation fiber having such a special structure as described above with a rare earth element, the present embodiment is useful to provide an optical amplifier of a small size which amplifies signal light while compensating for color dispersion without having an influence of polarization mode dispersion.

As described in the foregoing description, according to the present invention, an advantage is achieved in that an optical amplifier free from an influence of a polarization mode dispersion can be provided. Further, according to the present invention, another advantage is achieved in that a dispersion compensator which can compensate for color dispersion without having an influence of polarization mode dispersion can be provided.

While the specific embodiments of the present invention are described above, they are only illustrative but not restrictive. For example, while, in the embodiment described with reference to FIG. 9, the doped fiber 42' is described as being doped with a rare earth element such as Er for amplifying light, another optical fiber which is not doped with a rare earth element can be employed for the doped fiber 42'. In this instance, signal light and pumping light are introduced into the optical fiber, in which the signal light is amplified by non-linear scattering. The scope of the present invention is defined in the appended claims, and all variations and modifications which fall within the scope of equivalence of the claims remain within the scope of the present invention.

What is claimed is:

1. A dispersion compensator for compensating for color dispersion of an optical fiber transmission line, comprising:

a dispersion compensation fiber having color dispersion of a sign opposite to a sign of color dispersion of said optical fiber transmission line and having a length set so as to conform to a value of the color dispersion of said optical fiber transmission line;

optical coupling means having first to third ports, said first port being connected to an output end of said optical fiber transmission line, said second port being connected to a first end of said dispersion compensation fiber, said optical coupling means outputting light supplied to said first port from said second port, said optical coupling means outputting light supplied to said second port from said third port; and a polarization conversion mirror for converting light outputted from a second end of said dispersion compensation fiber into light having a polarization condition orthogonal and time-reversed to a polarization condition of the light outputted from said second end of said dispersion compensation fiber and supplying the light obtained by the conversion back to said second end of said dispersion compensation fiber.

2. A dispersion compensator according to claim 1, wherein said polarization conversion mirror includes:

collimate means for converting a divergent/convergent beam into a parallel beam on a main optical path and vice versa at said second end of said dispersion compensation fiber; and a 45-degree Faraday rotator and a mirror disposed in this order on said main optical path.

3. A dispersion compensator according to claim 1, wherein the color dispersion of said dispersion compensation fiber is approximately one half the color dispersion of said optical fiber transmission line.

4. A dispersion compensator according to claim 1, wherein said optical coupling means comprises an optical directional coupler.

5. A dispersion compensator according to claim 1, wherein said optical coupling means comprises an optical circulator.

6. A dispersion compensator according to claim 5, further comprising a first optical amplifier interposed in said optical fiber transmission line, and a second optical amplifier connected to said third port of said optical coupling means.

7. An optical amplifier for amplifying and outputting signal light from an optical fiber transmission line, comprising:

first optical coupling means having first to third ports, said first port being connected to an output end of said optical fiber transmission line, said first optical coupling means outputting light supplied to said first port from said second port, said first optical coupling means outputting light supplied to said second port from said third port;

a pumping light source for outputting pumping light;

second optical coupling means having fourth to sixth ports, said fourth port being connected to said pumping light source, said fifth port being connected to said second port, said second optical coupling means outputting light supplied to said fourth and fifth ports from said sixth port;

a doped fiber connected at a first end thereof to said sixth port and doped at least at a core thereof with a rare earth element; and a polarization conversion mirror for converting light outputted from a second end of said doped fiber into light having a polarization condition orthogonal and time-reversed to a polarization condition of the light outputted from said second end of said doped fiber and supplying the light obtained by the conversion back to said second end of said doped fiber;

the signal light from said optical fiber transmission line being amplified while it reciprocates in said doped fiber and then supplied to said second port passing said sixth port and said fifth port in this order.

8. An optical amplifier according to claim 7, further comprising a dispersion compensation fiber connected in cascade connection to said doped fiber, said dispersion compensation fiber having color dispersion of a sign opposite to a sign of color dispersion of said optical fiber transmission line, said dispersion compensation fiber having a length set so as to conform to a value of the color dispersion of said optical fiber transmission line.

9. An optical amplifier according to claim 7, wherein said doped fiber has color dispersion of a sign opposite to a sign of color dispersion of said optical fiber transmission line and has a length set so as to conform to a value of the color dispersion of said optical fiber transmission line.

10. An optical amplifier according to claim 7, wherein said first optical coupling means comprises an optical circulator, and said second optical coupling means comprises a wavelength division coupler.

11. An optical amplifier for amplifying and outputting signal light from an optical fiber transmission line, comprising:

first optical coupling means having first to third ports, said first port being connected to an output end of said optical fiber transmission line, said first optical coupling means outputting light supplied to said first port from said second port, said first optical coupling means outputting light supplied to said second port from said third port;

a pumping light source for outputting pumping light;

second optical coupling means having fourth to sixth ports, said fourth port being connected to said pumping light source, said fifth port being connected to said second port, said second optical coupling means outputting light supplied to said fourth and fifth ports from said sixth port;

a dispersion compensation fiber connected at a first end thereof to said sixth port for causing non-linear scattering with the pumping light; and a polarization conversion mirror for converting light outputted from a second end of said dispersion compensation fiber into light of a polarized condition orthogonal and time-reversed to a polarization condition of the light outputted from said second end of said dispersion compensation fiber and supplying the light obtained by the conversion back to said second end;

the signal light from said optical fiber transmission line being amplified by the non-linear scattering while it reciprocates in said dispersion compensation fiber and then supplied to said second port passing said sixth port and said fifth port in this order.

12. A dispersion compensator according to claim 7, wherein said polarization conversion mirror includes:

collimate means for converting a divergent/convergent beam into a parallel beam on a main optical path and vice versa at said second end of said doped fiber; and a 45-degree Faraday rotator and a mirror disposed in this order on said main optical path.

13. A dispersion compensator according to claim 11, wherein said polarization conversion mirror includes:

collimate means for converting a divergent/convergent beam into a parallel beam on a main optical path and vice versa at said second end of said dispersion compensation fiber; and a 45-degree Faraday rotator and a mirror disposed in this order on said main optical path.

* * * * *